Feb. 6, 1923.
W. R. SEIGLE
1,444,397
HEAT INSULATING MATERIAL
Filed Oct. 5,
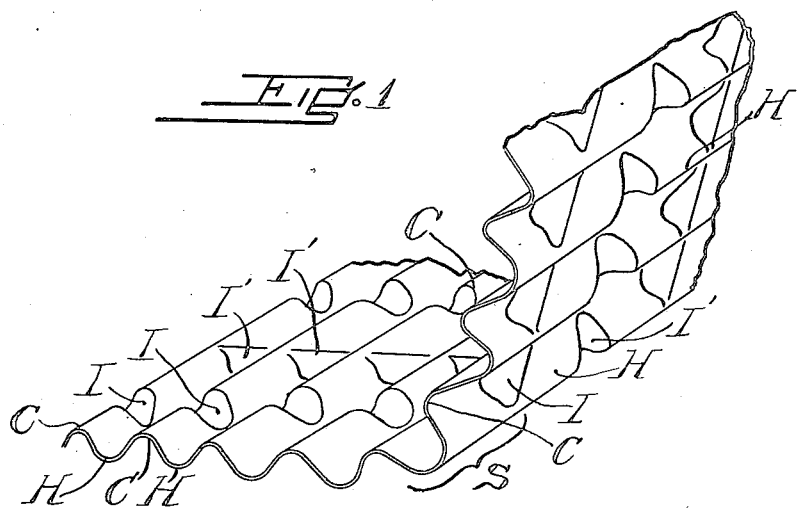
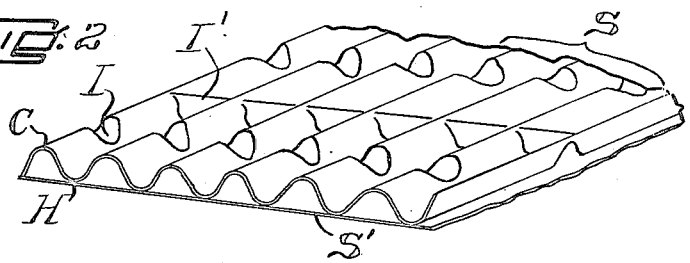
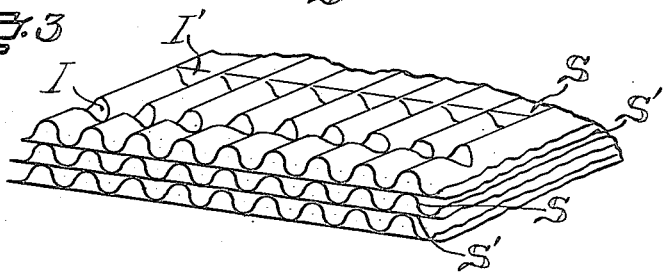
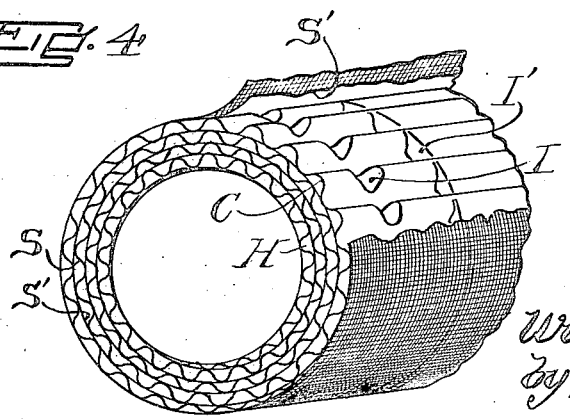
Inventor
William R. Seigle.
by Roberts Roberts Bachman
his attys.

Patented Feb. 6, 1923.

1,444,397

UNITED STATES PATENT OFFICE.

WILLIAM R. SEIGLE, OF NEW YORK, N. Y.

HEAT-INSULATING MATERIAL.

Application filed October 5, 1921. Serial No. 505,534.

*To all whom it may concern:*

Be it known that I, WILLIAM R. SEIGLE, a citizen of the United States of America, and resident of New York city, in the county of New York and State of New York, have invented new and useful Improvements in Heat-Insulating Materials, of which the following is a specification.

My invention relates to heat-insulating material, and has for its object the provision of cheaply made, yet durable and efficient heat-insulating coverings for flat or curved surfaces, and for miscellaneous specific uses, including for example steam boilers, steam pipes, refrigerating and heating apparatus.

In the last analysis, it may be said that practically the only true heat-insulator is air, and that to operate efficiently as such, air must be prevented as far as possible from circulating in the spaces where it is confined for heat-insulating purposes. Practically, therefore, the universal heat-insulator is air confined in cells. As a secondary consideration, it is of course desirable to have the solid walls which enclose insulating air spaces as thin as possible, and composed of material which conducts heat but slowly. Probably the most highly efficient heat-insulating material in general use is the magnesia covering frequently found on steam boilers, pipes, etc.; its efficiency is consequent upon the open cellular structure of the magnesia material, which holds in confinement innumerable, almost microscopic, isolated bodies of air. The magnesia itself is a low conductor of heat, and at no point presents any considerable uninterrupted cross section of solid material, so that the true non-conductive property of the air is enabled to produce its full effect, while the small proportions of each isolated body of air, confined within walls of magnesia, preclude any considerable transfer of heat by convective circulation.

This magnesia insulating material is relatively expensive, and for purposes which do not warrant the cost of its installation, other heat insulating materials, less efficient, but operating measurably according to the same physical principles, and possessing the advantage of relative cheapness, are commonly used. Notable among these is corrugated sheet material, for instance corrugated asbestos paper, alternating with uncorrugated sheets of the same material, so that the confined bodies of air, lying between the convolutions of the corrugated sheet and the surface of the uncorrugated sheet, are reduced in dimensions transversely of the corrugations, but are nevertheless susceptible to circulation, to a considerable degree, longitudinally of the corrugations. The asbestos paper itself fulfills the purpose of low heat conductivity, and can be flexed transversely of the corrugations so as to be wrapped around curved surfaces, as of pipes.

My invention is characterized by a method of manipulating and fabricating plastic sheet material, (of which asbestos paper in a moist state is the preferred example) which produces such a reduction in the size of the confined bodies of air, in all dimensions, that the non-conductive virtue of air is not appreciably offset by convective circulation. The method by which I have made this product is the subject matter of application for United States Letters Patent, (serially numbered 505,533,) as is also an improved mechanism for fabricating my new heat insulating material, the subject of application for United States Letters Patent (serially numbered 505,532) filed by me concurrently herewith.

In the drawings hereto annexed, which illustrate my invention,

Figure 1 is a view, in perspective, of a sheet of insulating material, shown bent so as to exhibit portions of both sides;

Figure 2 is a view in perspective of a sheet of insulating material, with a covering sheet attached;

Figure 3 is a view, in perspective, of a sheet of insulating material, built up of superposed corrugated and uncorrugated sheet-members; and Figure 4 is a view in perspective of a section of pipe covering, made by spirally wrapping a sheet of my insulating material upon itself.

In making my improved heat-insulating material, in its preferred form, and of the preferred material, I take a wet, and therefore plastic sheet of asbestos paper, of any selected weight or thickness, and form in it corrugations parallel to one dimension of the paper. Designating the maxima or crowns of the corrugations on one side of the sheet S (Fig. 1) as C, and the intervening minima or hollows, as H, I indent the crowns C, transversely of the dimension with which the corrugations are parallel, at I, I, preferably impressing these indentations so that their bottoms are practically flush with the surfaces of the hollows H. To obtain the full final effect of such indentations, I also indent the intervening minima of curvature, H, from the opposite side of the sheet S, as at I', I', impressing these indentations, preferably, until they are practically flush with the surfaces of the crests C. These indentations I', I', are also transverse to the corrugations, and the indentations I, I, and I', I' are preferably in lines at right angles to the corrugations, and alternate with each other. The distance between one row of indentations I, I, and the next may be determined to suit the ideas of the manufacturer; theoretically they should be close together, with the pitch or space from one crest C to the next, as the limit; but practically I have found that, in a corrugated asbestos paper sheet in which the pitch from crest to crest is about one-half inch and the height from crest to hollow about one-quarter inch, a spacing of two inches from one row of indentations I, to the next row I, assuming that rows of similar but opposite indentations I' are to intervene half way, is the limit of closeness which the asbestos paper will stand without tendency to rupture. Spacing of about three inches from one row of indentations I, to the next, with opposite indentations I' half way between is, I believe a safe practical standard. This produces inch and one-half spaces between each row of indentations and the next adjacent row of oppositely formed indentations.

A sheet of material thus formed is capable of being bent transversely to the length of the corrugations C, H, in the same manner and to the same degree, as a similar sheet of asbestos paper, corrugated, but not indented.

Such a sheet as is illustrated in Fig. 1 can be superposed on similar sheets, or wound spirally about a cylindrical body, such as a pipe, and while the spaces between adjacent indentations will not, in such case, be wholly enclosed, the indentations will constitute barriers against air circulation, and consequently greatly enhance the heat-insulating efficiency of the material, as compared with plain corrugated sheets.

Preferably, however, I supplement the corrugated sheet S, by attaching thereto a covering sheet S', which is preferably uncorrugated, as shown in Fig. 2.

When several such double sheets are superposed and secured together, in flat form as shown in Fig. 3, or when one such sheet is wound spirally on itself, as shown in Fig. 4, the combination of the corrugated, oppositely indented sheet-members with the uncorrugated covering sheets, produces a cellular structure, characterized by isolated air containing cells, each bounded by a convolution of the corrugation of the corrugated sheet, a portion of the covering sheet, and two adjacent indentations, I or I' as the case may be. If, as is preferred, these indentations have been impressed so that their bottoms are flush with the surfaces of the adjoining crests of corrugation, they serve as practically complete stops to air circulation. The several members of the structure above described are preferably secured together by an adhesive, such as sodium silicate.

If it be desired to produce a corrugated and indented, or cross-corrugated sheet of such material as asbestos paper, in which the spacing or pitch of the corrugations is substantially the same for each set, this can be accomplished by first corrugating a moist sheet of the asbestos paper in one direction, between meshing corrugated rolls, and then laying this corrugated sheet upon a flat plate or table, the surface of which is corrugated, with the corrugations formed in the sheet lying transversely—preferably at right angles,—to the corrugations of the plate, and then bringing a similarly corrugated plate down upon the paper; the upper and lower plates being so formed and mounted that, if brought together with no intervening material, their corrugations would fit into each other. By this means the original or first formed corrugations in the paper are transversely indented or crushed, along lines of transverse corrugations. If the pressure by which these transverse second corrugations are formed, be moderate and regulated, the sheet can be thus cross-corrugated without rupture and is adapted to form cellular insulating sheets by being assembled with covering sheets. Or, it may be formed into superposed sheet layers by assembling several such cross-corrugated sheets one upon another, or by winding a sheet spirally. In the latter cases, the cellular enclosures for the retention of air will probably not be complete and mutually isolated, but the cross corrugations will offer such obstacles to the free circulation of air between sheet-layers as will greatly improve the heat insulating efficiency as contrasted with sheets corrugated in only one direction.

Herein I use the terms "indented" and "indentation", "corrugated" and "corrugation", for the purpose merely of descriptively distinguishing one set of indentations in the sheet material from another. Both sets are formed by impression or indentation, and either, where the indentations are arranged in lines, constitutes corrugation.

What I claim and desire to secure by Letters Patent is:

1. Heat-insulating material, comprising in combination, a sheet convoluted into corrugations parallel to one dimension, said corrugations indented transversely to said dimension, and a covering sheet secured to the said corrugated and indented sheet.

2. Heat-insulating material, comprising in combination a sheet convoluted into corrugations parallel to one dimension, said corrugations indented transversely to said dimension and from opposite sides of the sheet, and a covering sheet secured to the said corrugated and indented sheet.

3. Heat-insulating material comprising in combination a sheet convoluted into corrugations parallel to one dimension, said corrugations indented transversely to said dimension, and an uncorrugated covering sheet secured to the said corrugated and indented sheet.

4. Heat-insulating material comprising in combination a sheet convoluted into corrugations parallel to one dimension, said corrugations indented transversely to said dimension and from opposite sides of the sheet, and an uncorrugated covering sheet secured to the said corrugated and indented sheet.

5. Heat-insulating material, comprising superposed sheet-layers, each having a sheet-member corrugated parallel to one dimension, indented transversely to said dimension, and a covering sheet secured to said corrugated and indented sheet.

6. Heat-insulating material, comprising superposed sheet-layers, each having a sheet-member corrugated parallel to one dimension and indented transversely to said dimension and from opposite sides, and a covering sheet secured to said corrugated and indented sheet.

7. Heat-insulating material, comprising superposed sheet-layers, each having a sheet-member corrugated parallel to one dimension and indented transversely to said dimension, and an uncorrugated covering sheet secured to said corrugated and indented sheet.

8. Heat-insulating material, comprising superposed sheet-layers, each having a sheet-member corrugated parallel to one dimension and indented transversely to said dimension and from opposite sides, and an uncorrugated covering sheet secured to said corrugated and indented sheet.

9. Heat-insulating material, comprising in combination a sheet formed with two sets of undulations, each set transverse to the other, and a covering sheet secured to the said indentated sheet.

10. Heat-insulating material comprising superposed sheet-layers, each characterized by two sets of undulations, each set transverse to the other, and having a covering sheet secured to said undulated sheet.

Signed by me at New York city, N. Y., this 23rd day of September, 1921.

WILLIAM R. SEIGLE.